United States Patent Office 3,697,372
Patented Oct. 10, 1972

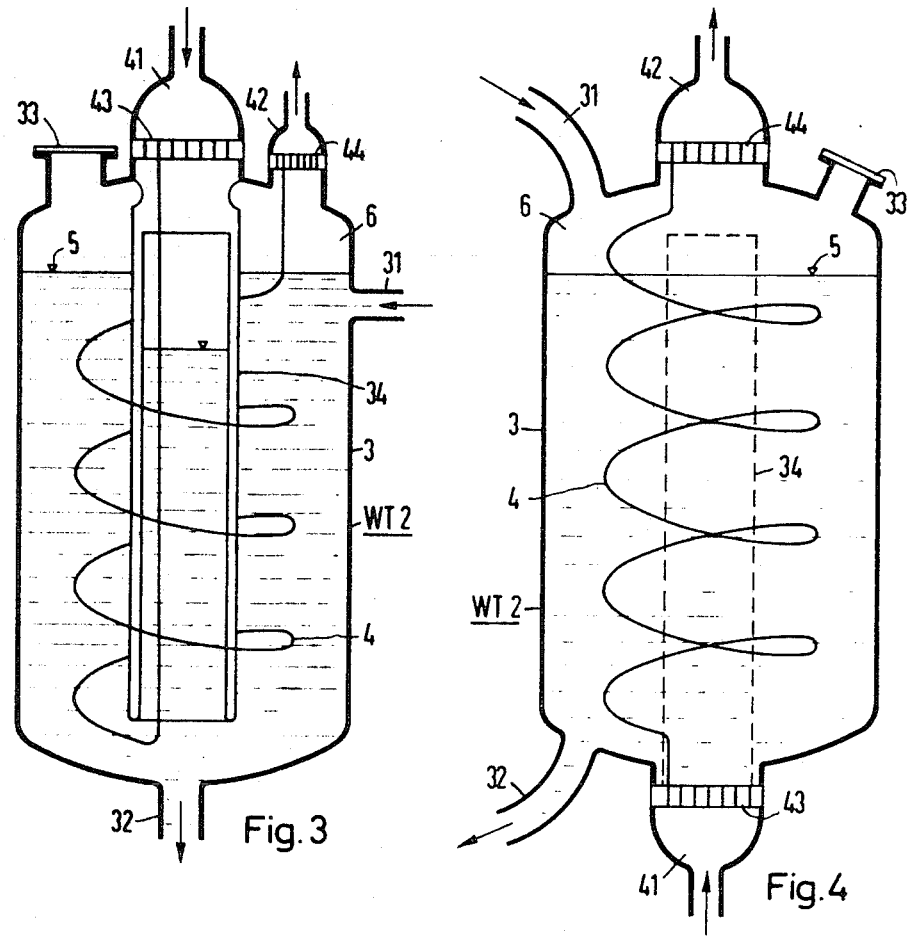
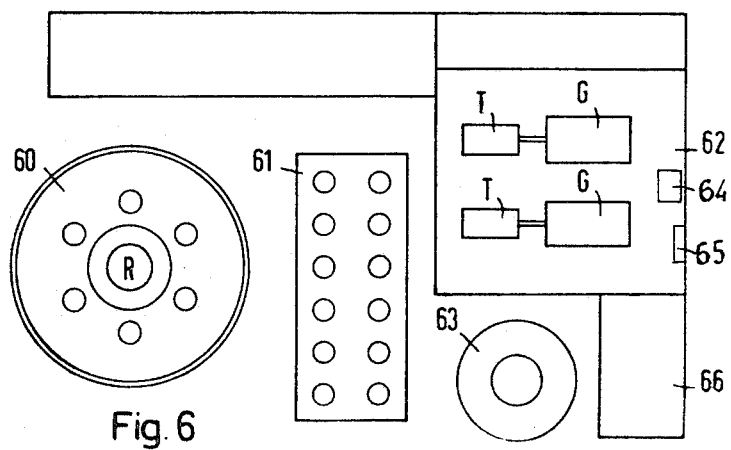

3,697,372
NUCLEAR REACTOR INSTALLATION
Hans-Peter Schabert, Erlangen, Germany, assignor to Siemens Aktiengesellschaft, Berlin and Munich, Germany
Filed Oct. 14, 1968, Ser. No. 767,126
Claims priority, application Germany, Oct. 13, 1967, P 16 01 004.1
Int. Cl. G21d 1/02
U.S. Cl. 176—60           9 Claims

ABSTRACT OF THE DISCLOSURE

Nuclear reactor installation for power production includes a gas turbine circulatory system operating with a nonideal gas such as $CO_2$ and having a compressor stage supplied at full-load operation with noncondensed working medium having a density of at least 200 kg./m.$^3$ and preferably at supercritical pressure and substantially critical temperature.

My invention relates to nuclear reactor installations and more particularly to such installations wherein the coolant has a moderately high temperature, such as 500 to 600° C. for example, at the coolant outlet from the reactor. Since the efficiency of a conventional gas turbine installation with a virtually ideal gas, such as air or helium for example, is inadequate at these temperatures, it is the usual practice to provide heated steam generators with the respective primary coolants, in the case of such reactor installations, in order to transform the heat ultimately with the aid of a steam turbine process into electrical energy. The steam turbines that are thereby required have relatively large dimensions, and the auxiliary circulatory systems associated therewith are very extensive and therefore costly. The expense for the operation, maintenance and repair of parts subject to wear, such as turbine blades and stuffing boxes, is relatively high. Added to this is the danger of a violent explosion between coolant and steam when, for example, the reactor is cooled by sodium and a steam generator becomes defective and leaks. Such defects are most probable for steam because of the high corrosion rate on the steam side, and due to the great temperature differences at the end of the evaporator zone which can cause thermal shocks and ruptures due to metal fatigue.

The problem of the high corrosion rate with steam, particularly the tension crack corrosion of austenitic steel members, also complicates the use of direct steam-cooling of the fuel elements in the reactor, because radioactive corrosion products and the fission products from defective fuel elements are carried away into the complex steam turbine installation.

It is accordingly an object of my invention, with respect to the energy conversion, to provide a nuclear reactor installation which avoids the aforementioned dangers and requires as little technical expense as possible while maintaining relatively good efficiency. Even when a moderate loss in efficiency must be taken into consideration, low production costs for the kilowatt-hours are to be anticipated due to reduced installation costs. The production costs of the kilowatt-hours is alone the determining factor, in the final analysis, of the efficiency rating of a nuclear reactor plant.

Since the loading factor (annual usable hours) of the nuclear reactor plants should decrease with increasing number of installed nuclear reactor plants, the efficiency gradually drops in importance for the current costs behind capital service and personnel costs. This is true particularly for such reactors having fuel consumption costs that are relatively low.

With the foregoing and other objects in view, I provide nuclear reactor installation in accordance with my invention, comprising a gas turbine circulatory system having recuperative-heat exchangers and operating with a nonideal gas, such as $CO_2$ for example, the circulatory system also having a compressor stage supplied at full-load operation with noncondensed working medium having a density of at least 200 kg./m.$^3$, and preferably at supercritical pressure and substantially critical temperature. $CO_2$ gas has a density of 200 kg./m.$^3$, for example, at 63 atmospheres absolute pressure (ata.) and 25° C. or at 72° ata. and 40° C.

In contrast to the heretofore known proposed processes wherein the working medium such as $CO_2$ or $C_4F_8$ for example, is condensed before entry thereof into the compressor, the preferably supercritical gas state, according to the invention, located upstream of the compressor, has the advantage of precluding cavitation in the compressor (pump). Moreover, the difference of the specific heats of the medium at the high- and low-pressure sides at the cold end of the recuperative heat exchanger is smaller, so that the recuperation becomes better and the loss in efficiency thereby becomes largely compensated as a result of the slightly increased compressor power requirement. In the case of the working medium $CO_2$, which is especially suitable for particular types of reactors due to its chemical stability, the additional advantage is afforded that the compressor inlet temperature need not drop below 30° C. (the critical state being 31° C., 75 ata.), which is very difficult to control in the summer for river-water temperatures of 22° C. On the contrary, for example at 100 to 120 ata. compressor inlet pressure, the general efficiency is barely affected when the compressor inlet temperature rises to 40° C. This affords considerable economies on the cooling water side or the use of cooling towers in the case of water deficiency, and the use of an intermediate water cooling circuit when necessary for practical reasons, such as rust formation or dirt or grime deposits, or for protection of local inhabitants against radioactive propagation due to a cooling tube break for a reactor with a direct circulatory loss. A further advantage is provide by the possibility of thereby effecting the regulation of the turbine power at least partly in a relatively loss-free manner and continually by the fact that the cooling water temperature and the compressor inlet temperature therewith are varied. For this purpose, the intermediate circuit, applicable by dispensing with condensation, in turn affords desirable potentialities because it can be transversed by a water quality which precludes corrosive damage at the pressure-conducting tubes constructed for example of plain steel, as well as precluding thereat the deposit of solid material originating in river water at a temperature of more than 45° C. As an example, a slight temperature increase from 40 to 60° C. at the inlet of a compressor supplied with $CO_2$ at 110 ata. produces a reduction of more than half, i.e. about 320 instead of 670 kg./m.$^3$ in the density of the medium and therewith approximately in the weight throughput thereof.

Although the invention of this application wherein the energy conversion problem is solved is particularly of importance for nuclear reactors cooled by liquid metal such as sodium for example, it is nevertheless equally applicable for salt-melting, suspension and gas-cooled nuclear reactors. If the operating pressure thereof is relatively low, for example in the order of magnitude of 40 ata., a primary-secondary heat exchanger, as for the other aforementioned reactors, could be installed for using the high pressure system of the invention. The high gas pressure in the heat exchanger permits good heat transfer and compact construction of the heat exchanger, an advantage that is of great importance particularly for sodium-cooled systems.

When the gas-cooled reactor proper is constructed for high pressure, the system of the invention can then be used in the direct circuit. The installation would thereby be essentially simplified. Moreover, a higher gas pressure also permits the use of the greatest thermal power density in the nuclear core, which is important for example for $D_2O$-moderated and fast reactors, as well as the use of small tube passages in the pressure vessel so that no sudden pressure drop can occur.

Such nuclear reactors in association with a simple gas turbine circuit according to this invention permit an especially compact construction, and are capable of being installed for example in a common prestressed concrete pressure vessel. At the very least, the recuperative heat exchanger and the water cooler can be installed in a common prestressed concrete vessel, the inner insulation of which can be economized to a very great extent, if necessary.

Although the invention is illustrated and described herein as embodied in nuclear reactor installation, it is nevertheless not intended to be limited to the details shown, since various modification and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings, in which:

FIGS. 3 and 4 are schematic longitudinal sectional views of two different embodiments of a sodium-$CO_2$ heat exchanger employed in the installation shown in FIG. 1;

FIG. 6 is a lay-out plan of a large nuclear power plant according to the invention;

Figure 1:
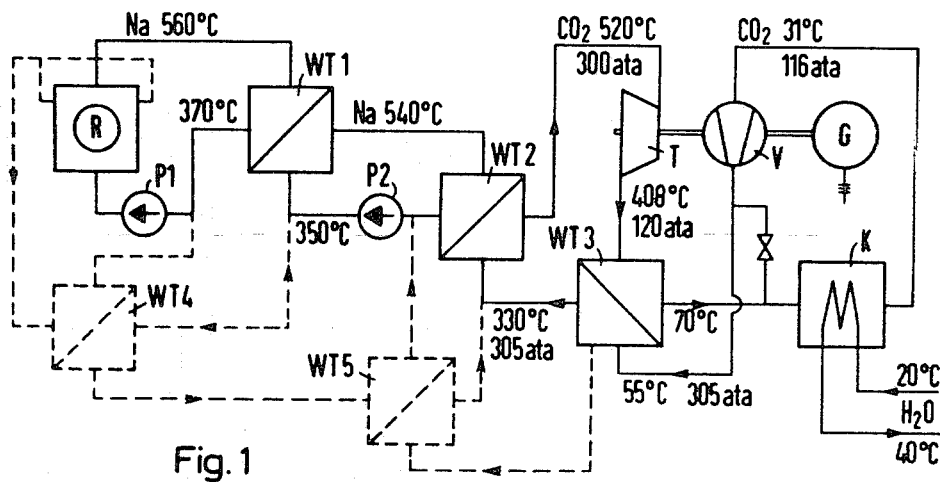
FIG. 1 is a schematic view of the circuit of a nuclear reactor installation according to my invention.

Referring now to the drawing and first particularly to FIG. 1 thereof, there is shown a nuclear reactor R cooled with sodium which leaves the reactor with a temperature of 560° C., gives up the thermal energy thereof through a heat exchange WT1 to an intermediate sodium circulatory loop, and then returns at a temperature of 370° C. through a circulating pump P1 to the reactor R. The sodium of the intermediate loop leaves the heat exchanger WT1 at a temperature of 540° C., transfers the thermal energy thereof in a heat exchanger WT2 to a gas turbine circulatory loop, and then returns at a temperature of 350° C. through a circulating pump P2 to the heat exchanger WT1. The gradient of the heat exchanger WT1 is about 20° C. over the entire heating surface thereof. The heat exchanger WT2 also has the same temperature gradient. On the secondary side of the heat exchanger WT2, carbon dioxide at a pressure of 300 ata. and a temperature of 520° C. is discharged therefrom and subsequently returned thereto at a temperature of 330° C. and pressure of 305 ata. The high pressure gas discharging from the secondary side of the heat exchanger WT2 is expanded in the turbine T to 120 ata. with a residual temperature of 408° C. In a recuperative heat exchanger WT3, the residual heat quantity is transferred to the high pressure gas flowing back to the heat exchanger WT2 so that the low pressure gas leaves the recuperative heat exchanger WT3 at a temperature of only about 70° C., and is cooled to 31° C. in a conventional cooler K of known construction for example in a direct or indirect manner by river water. At this temperature of 31° C. and at a pressure of 116 ata., the coolant gas flow to the compressor V. Since the collant gas enters the compressor V at a relatively great density, i.e. the volume thereof is about 1.5 liters per kilogram, the power consumption of the compressor V is relatively low, i.e. it is about 30% of the generator power output. The operating gas whose temperature and pressure are raised in this compressor V to 55° C. and 305 ata., respectively, is heated at the secondary side of the heat exchanger WT3, as aforementioned to 330° C. and is then conducted at this temperature to the secondary side of the heat exchanger WT2 where it again absorbs the heat from the intermediate sodium loop passing through the primary side of the heat exchanger WT2. The over-all general efficiency for the foregoing embodiment of a system according to my invention is about 37%.

Two additional heat exchangers WT4 and WT5 are shown in dotted lines in FIG. 1. They are visualized as being employed in the special case where a considerable quantity of coolant accumulates in the reactor and is heated up less than the main flow (for example in the radial breeder mantle of a sodium-fast breeder reactor).

To improve the over-all efficiency, it may be desirable to separate the cooler branch flow (of about 10%, for example) in order to keep the temperature of the main flow high. The low-value heat of the branch flow is thereby passed separately through the heat exchangers WT4 and WT5 to a high-pressure gas branch flow, which is conducted parallel to the recuperator WT3. The material-dependent varying gradient in the recuperator WT3 is thereby adjusted and the high-pressure side recuperator outlet temperature is increased. It may be desirable to draw the high-pressure partial gas flow from a tap of the recuperator WT3.

Figure 2:
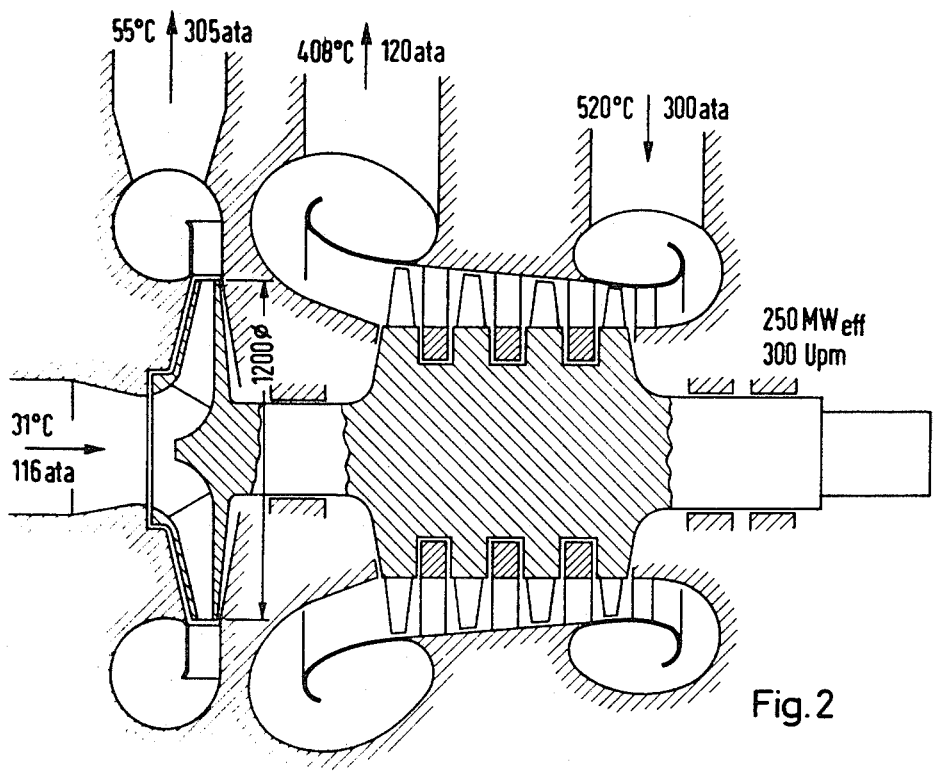
FIG. 2 is a schematic longitudinal sectional view of the assembled turbine and compressor of the installation shown in FIG. 1.

The gas turbine T employed in the illustrated circuit of FIG. 1, inclusive of a radial compressor, is shown schematically in a sectional view in FIG. 2. It can be concluded that, as compared to steam turbines, the assembled structure of FIG. 2 is exceptionally small and has a relatively low rotary speed so that additional sealing rims opposite the housing can be provided at the impeller blades so as to improve the efficiency of the turbine. Oil stuffing boxes can be inserted for sealing the high pressure waves or surges, as are for example employed and proposed for circulating pumps or blowers in reactor technology. A spiral housing with more than one connecting tube can be used in the radial compressor in order to achieve an especially high efficiency.

FIGS. 3 and 4 show two possible embodiments of the heat exchanger WT2 wherein heat transfer from sodium to $CO_2$ takes place. It may also be noted here that obviously several of such heat exchangers may be connected in parallel in the installation according to my invention.

The heat exchangers of FIGS. 3 and 4 include a vessel 3 provided with inlet and outlet openings 31 and 32, respectively, for the primary heat carrier, liquid sodium. The sodium does not fill the entire vessel 3 but rather has a liquid surface 5 above which there is located a protective gas 6, such as argon for example. The heat exchanger tubes 4 proper (only one of which is illustrated) are disposed within the sodium volume in the vessel 3 and are traversed by operating gas such as $CO_2$ for example. The tubes 4 have a diameter of, for example, 25 mm., and a wall thickness of 5 mm., and are helically wound about a winding body or core 34 in equally long, parallel-connected strings. In the embodiment of FIG. 3, the inlet 41 and the outlet 42 of the operating gas are located at the upper end of the vertically positioned vessel 3 so that the tube plates 43 and 44 do not come into contact with the liquid sodium. According to FIG. 3, the heat exchanger tubes 4 first extend through the interior of the winding core 34. The winding core 34, as shown in FIG. 3, is of double-wall construction, the space intermediate the double walls being filled with the protective gas, such as argon, since the protective gas space 6 located above the surface 5 of the sodium communicates with the intermediate space through suitable openings 4' formed in the outer wall of the winding core 4. The double-walled tubular core 34 therefore has a thermally insulating effect so that the heat exchanger tubes 4 become heated gradually.

In the structure of the heat exchanger shown in FIG. 4, the winding core 34 serves solely as a filling body since the inlet for the operating gas is located at the bottom end of the vertically disposed vessel 3. In the embodiment of FIG. 4, the tube plate 43 is in contact with the sodium, so that, in contrast to the embodiment of FIG. 3, wherein low alloy steel such as 10 CrMoNiNb 910 can be employed for the tube plates 43 and 44, higher requirements on the durability of the material must be imposed under certain conditions for the tube plate 43 of the embodiment of FIG. 4.

Both embodiments of the heat exchanger operate on the counter-flow principle whereby an unchanged temperature difference of about 20° C. is to be expected at the tubes and tube plates. The tubes are therefore only slightly stressed by thermal stresses so that they can be loaded without difficulty with the provided operating pressure of about 300 ata. To get an idea of the order of magnitude of this heat exchanger WT2 it should be noted that if it has a diameter for example of 3 meters, its height is about 9 meters. The heat exchanger tubes 4 are about 90 meters long for about 400 parallel-connected strings thereof. Naturally, these 400 tube strings need not necessarily be held together in one tube plate, but rather can be distributed over several tube plates, the respective outlets therefrom being connected to a common line for the operating medium.

Figure 5:
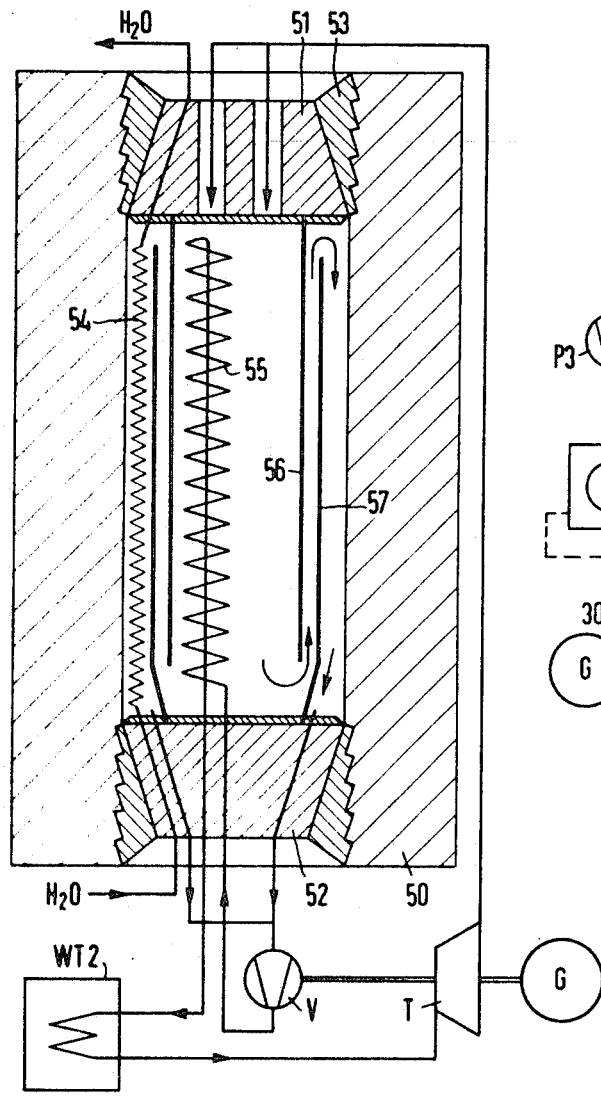
FIG. 5 is a schematic longitudinal sectional view of an assembly of the heat exchanger WT3 and the cooler K connected to other components of the installation shown in FIG. 1.

FIG. 5 illustrates a possible embodiment of the heat exchanger WT3 and the cooler K. Both of these apparatuses are in the form of helical tube bundles and are located in a prestressed concrete pressure vessel 50, which is assembled out of component parts prefabricated in a cylindrical portion and has two conical stoppers 51 and 53 at the ends thereof, which are slightly displaceable relative to the wedges 53, under the action of inner pressure. The stoppers 51 and 52 and the cylinder portion of the vessel 50 are provided on the interior surfaces thereof with a water-cooled steel sealing skin which has a spring-elastic expansion equalizer (Torus) in the corners or edges thereof. An inner thermal insulation is provided only in the vicinity of the stoppers 51, 52.

In the cylinder portion of the vessel 50, the low pressure gas contacting the sealing skin has a temperature of only 70° C. or less. The sealing skin is supplied with the same coolant water as are the tube bundles 54 of the cooler K and acts as an additional cooler heating surface.

In the region of the helical tube bundles 55 of the recuperative heat exchanger, the low pressure gas flows downwards (FIG. 5) and transfers the heat content thereof to the upwardly flowing high pressure gas. To avoid thermal instability, the low pressure gas is again guided upwardly in the annular space between cylindrical guide plates 56 and 57 before it reaches the cooler portion 43. The inner guide plate 56 is thermally insulated. In this insulation of plate layers, the gas has a temperature of somewhat over 70° C. and, accordingly, the insulating action does not suffer from an excessive medium density in the stagnating gaps.

FIG. 6 is a plan layout of a large nuclear power plant according to the aforedescribed embodiment. The reactor R and the intermediate heat exchanger WT1 for the sodium-secondary circuit are mounted in a reactor building 60. In a secondary building 61 are housed numerous Na-$CO_2$ heat exchangers WT2 together with associated circulating pumps. In a main building 62, are located turbines T and generators G as well as auxiliary equipment 64, a control panel or switchboard 65, and a coolant water supply 66. The concrete pressure vessel 63 with recuperator and cooler is so disposed that relatively short conduits can connect the latter to the turbines and the sodium-secondary loop.

Figure 7:
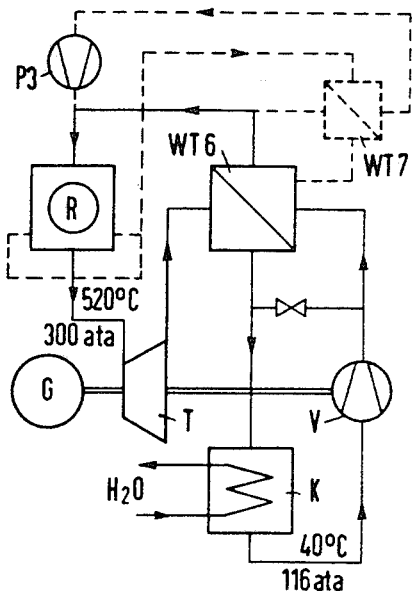
FIG. 7 is a view similar to that of FIG. 1 of a modified circuit employed with a fast breeder reactor.

A second embodiment of a nuclear reactor installation according to my invention is shown in FIG. 7 and includes a fast breeder reactor having $CO_2$ as coolant at a very high pressure (300 ata.) and directly supplied to the gas turbine T. In the schematic circuit diagram of FIG. 7, the installation of the invention can be seen to be significantly simplified by the omission of the heat exchangers WT1 and WT2 of the embodiment of FIG. 1. The recuperative heat exchanger WT6 (FIG. 7) fulfills the same functions as the recuperator WT3 of FIG. 1. The branch flow heat exchanger WT7 shown in FIG. 7 by dotted lines serves together with the circulating blower or compressor P3 for efficiency-improving separate conduction of the existing, weakly heated quantities of coolant in an analogous manner as in the embodiment of FIG. 1.

Figure 8:
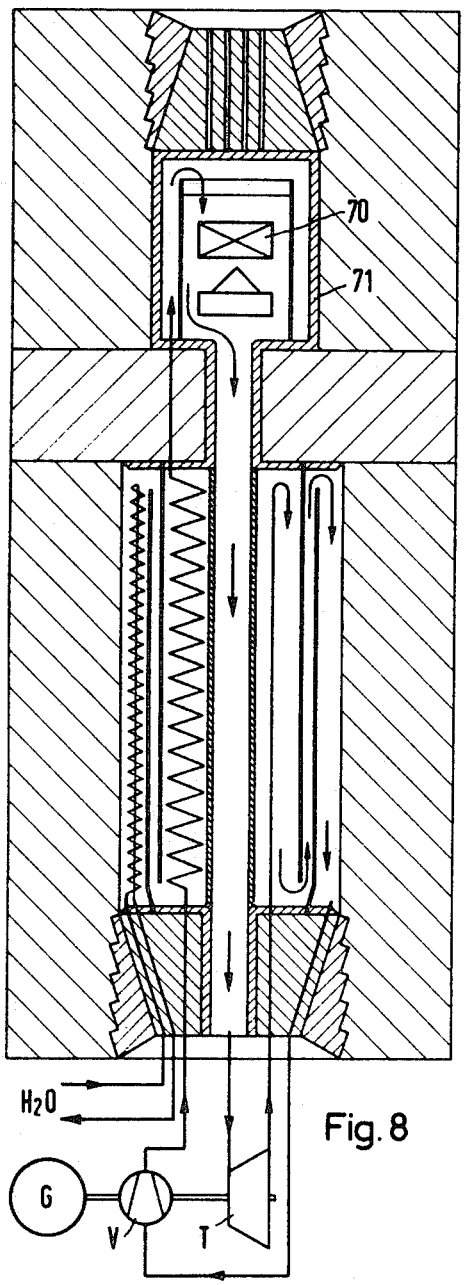
FIG. 8 is a view similar to that of FIG. 5 wherein the reactor together with the recuperator and cooler of FIG. 7 are assembled in a prestressed concrete pressure vessel.
Figure 9A:
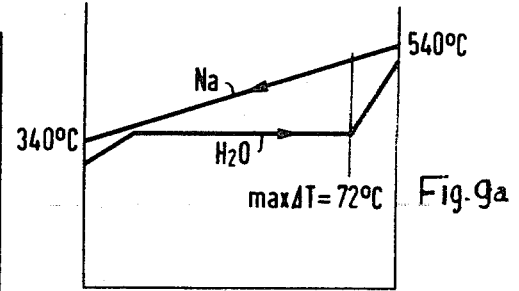
FIGS. 9a and 10a are plot diagrams of the complete temperature gradients respectively of $Na/H_2O$ and $Na/CO_2$ for the heat exchanger of FIG. 8.
Figure 9:
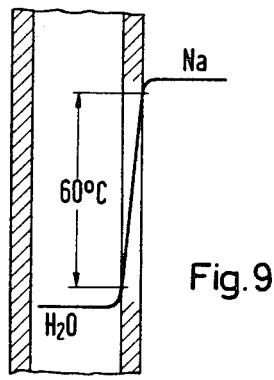
FIGS. 9 and 10 are respectively fragmentary longitudinal sectional views of a heat exchanger tube showing diagrammatically the heat transfer gradient through the tube for $Na/H_2O$ and $Na/CO_2$.
Figure 10A:
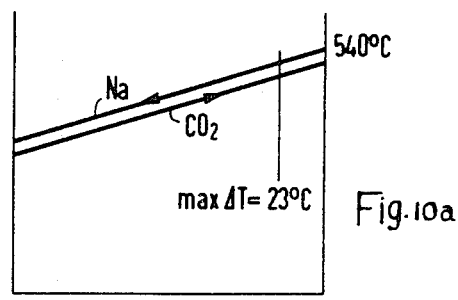
Figure 10:
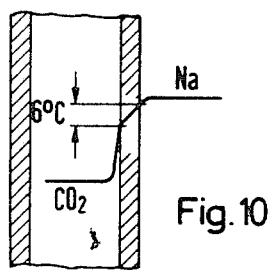

FIG. 8 illustrates one possible manner of installing the reactor together with the recuperator and cooler in a pre-stressed concrete vessel having two chambers for different pressures, and which is otherwise constructed in an analogous manner to the installation shown in FIG. 5. The reactor core 70 is traversed by coolant medium in a direction downwardly from above, and the heated medium flows out through the lower stopper. The reactor chamber has an inner thermal insulation 71. The pre-stressed concrete pressure vessel is located together with the turbines in a pressure-tight containment structure (not shown) whereas the generator is located outside the containment structure through which the generator shaft extends and is conected to the turbine shaft. For further details of construction, reference can be had to my Pat. No. 3,444,038.

From the foregoing description it follows that such a gas turbine system, especially for $CO_2$-cooled nuclear reactors, and also for such reactors having a primary cooling medium such as sodium, which cannot be used for direct production of energy, permits a relatively simple construction of the nuclear reactor installation, whereby not only does the gas turbine afford great space-saving and cost-saving advantages over the steam turbine, but rather also fewer auxiliary machines and no feed-water preparatory or treatment systems are necessary. Hand-in-hand therewith goes a reduction or diminution of the electrical switchgear which moreover becomes more clearly arranged. The entire installation becomes maintenance-free, especially also with respect to the turbine which exhibits no erosion phenomena.

These advantages are further emphasized by the fact that the use of $CO_2$ precludes the danger of chlorine precipitation as occurs with the use of water, and which can cause grave corrosion damage in the steam generator. Also, the thermally produced stressing of the heat exchanger tubes is very slight. The temperature drop through thickness of the tube wall for heat transfer from Na to $CO_2$ is for example 6° C., whereas from Na to $H_2O$ is 60° C. These relationships are graphically illustrated in FIGS. 9, 10, 9a and 10a. It is further to be noted that, in contrast to a Na-$H_2O$ reaction, the reaction of Na and $CO_2$ will not produce any great development of gas and therefore also no dangerous pressure wave as may be feared for example as a consequence of an oxyhydrogen explosion, which is of especially great advantage from a safety engineering standpoint. One ought to expect, therefore, that due to the slight susceptibility to damage of the Na-$CO_2$ heat exchanger, sooner or later the sodium secondary circulatory loop can be economized, which would present a decisive advance with regard to installation costs and efficiency.

The invention of the instant application as aforementioned, is not limited to the specific embodiments described hereinbefore. Thus, for somewhat easier start-up and shutdown as well as partial load operation, the aforedescribed and illustrated single-shaft turbine can be replaced by a double-shaft arrangement such as is described for example in copending application Ser. No. 755,008, filed Aug. 23, 1968, of which I am a co-inventor. This is particularly recommended primarily when the reactor has no independent emergency cooling system. (For sodium breeders, such emergency cooling system is provided as a rule with liquid metal, natural circulation and air coolers.) There can also be provided an intermediate heating system in the heater WT1 or an intermediate cooler in the compressor portion which will certainly disturb the simplicity of the installation and, under certain conditions, will require an additional chamber with different pressure in the concrete pressure vessel. Furthermore, the separate conduction of heat away from a weakly heated branch flow of the primary medium to the recuperator can be effected in other ways as for example are disclosed in copending application Ser. No. 765,264, filed Sept. 27, 1968, of which I am co-inventor.

I claim:

1. In a nuclear reactor installation for producing power, in combination, a closed reactor circulatory system including nuclear reactor means and a primary side of a heat exchanger, and a closed gas turbine circulatory system traversed by a non-ideal gas and including the secondary side of the heat exchanger for heating the non-ideal gas to a predetermined temperature and a turbine stage located downstream of said heat exchanger in said closed gas turbine circulatory system, said closed gas turbine circulatory system being indirect in that said turbine stage is not connected directly to said heat exchanger downstream thereof, said closed gas turbine circulatory system having, between said turbine stage and said heat exchanger, a recuperative heat exchanger and a compressor stage to which said gas is supplied in noncondensed state and at a density of at least 200 kg./m.$^3$, said gas supplied to said compressor stage being at supercritical pressure and substantially critical temperature.

2. Nuclear reactor installation according to claim 1, including a heat exchanger acting as a heater connected between said reactor and said turbine.

3. Nuclear reactor installation according to claim 2, wherein said heat exchanger acting as a heater comprises a vessel traversed by sodium and containing a protective gas, and a tubular winding disposed coaxially with the axis of symmetry of said vessel and traversed by $CO_2$, said tubular winding being immersed in the sodium contained in said vessel.

4. Nuclear reactor installation according to claim 1, wherein a recuperative heat exchanger and said cooler are mounted in a prestressed concrete pressure vessel.

5. Nuclear reactor installation according to claim 4, wherein said concrete pressure vessel has a cylindrical inner surface, and said cooler is disposed alongside said surface, said pressure vessel being noninsulated in the interior thereof in the vicinity of said cooler.

6. Nuclear reactor installation according to claim 1, including means for at least partly regulating the power of the gas turbine circulatory system by varying the inlet temperature of the gas to the compressor stage.

7. Nuclear reactor installation according to claim 1, wherein said reactor together with said recuperative heat exchanger and a cooler are installed in a prestressed concrete pressure vessel formed with at least two chambers.

8. Nuclear reactor installation according to claim 2, including at least one separate heat exchanger for supplying a branch flow of said gas at high pressure with heat quantities yielded at lower temperature levels in said reactor, said branch flow being in a direction parallel to at least a partial length of said recuperative heat exchanger.

9. Nuclear reactor installation according to claim 1 wherein said nuclear reactor means includes a closed primary loop including a nuclear reactor and a primary side of a first heat exchanger, and an intermediate loop including the secondary side of said first heat exchanger and the primary side of a second heat exchanger, the secondary side of the heat exchanger in said closed gas turbine circulatory system being the secondary side of said second heat exchanger.

References Cited

UNITED STATES PATENTS

| 3,377,800 | 4/1968 | Spillmann | 176—60 X |
| 3,410,091 | 11/1968 | Frutschi | 176—60 X |
| 3,444,038 | 5/1969 | Schabert | 176—60 X |

FOREIGN PATENTS

| 1,058,518 | 2/1967 | Great Britain | 176—60 |

REUBEN EPSTEIN, Primary Examiner

U.S. Cl. X.R.

60—2, 36; 176—87